United States Patent

Chresand et al.

[11] Patent Number: 5,518,668
[45] Date of Patent: May 21, 1996

[54] AIR STRIPPER ARRANGEMENT

[75] Inventors: Thomas J. Chresand, Minneapolis; James J. Higgins, Greenwood; Robert E. Clifford, III, Minnetonka, all of Minn.

[73] Assignee: Biotrol, Inc., Eden Prairie, Minn.

[21] Appl. No.: 198,467

[22] Filed: Feb. 18, 1994

[51] Int. Cl.$^6$ .................................................. B01D 47/00
[52] U.S. Cl. ........................ 261/113; 55/233; 95/213; 261/114.5
[58] Field of Search ....................... 261/113, 114.5; 55/233, 240, 242, 257.6; 95/199, 213, 221, 223

[56]  References Cited

U.S. PATENT DOCUMENTS

| | | | |
|---|---|---|---|
| 185,640 | 12/1876 | Jones | 261/113 |
| 488,813 | 12/1892 | Hosford | 261/113 |
| 493,156 | 3/1893 | Fitzgerald | 261/113 |
| 1,738,870 | 12/1929 | Cox et al. | 261/113 |
| 2,515,507 | 7/1950 | Glitsch | 261/114.5 |
| 2,791,408 | 5/1957 | Lewis | 261/113 |
| 2,939,771 | 6/1960 | McDonald et al. | 261/113 |
| 4,028,443 | 6/1977 | Livingston et al. | 261/114.5 |
| 4,174,363 | 11/1979 | Bruckert | 261/114.5 |
| 4,266,949 | 5/1981 | Kuxdorf et al. | 261/114.5 |
| 5,240,595 | 8/1993 | Lamarre . | |

FOREIGN PATENT DOCUMENTS

WO9214533A1  9/1992  WIPO .

*Primary Examiner*—C. Scott Bushey
*Attorney, Agent, or Firm*—Merchant, Gould, Smith, Edell, Welter & Schmidt

[57] ABSTRACT

An air stripper assembly includes a housing having at least one sieve tray operatively positioned therein. Each sieve tray is selectively removable from the housing. If more than one sieve tray is positioned within the housing, each is removable without a need to change orientation of any other sieve tray positioned within the housing. Thus, an operator can easily clean and maintain a selected sieve tray, without disassembling the entire assembly or affecting the location of other sieve trays.

5 Claims, 4 Drawing Sheets

AIR STRIPPER ARRANGEMENT

FIELD OF THE INVENTION

The present invention relates to an arrangement for use in reducing the presence of contaminating, volatile, organics in water. In particular, the invention concerns arrangements wherein air is bubbled through water, to result in air stripping of the volatiles from the contaminated water. Arrangements according to the present invention are characterized by the presence of at least one independent sieve tray which can be easily cleaned and, if desired, replaced.

BACKGROUND OF THE INVENTION

A sieve-tray air stripper arrangement is a water-treatment apparatus that is used to effect the transfer of volatile organic chemicals from water (aqueous phase) to air (gaseous phase). Conventional such arrangements generally comprise a series of chambers, stacked vertically, in which each chamber is separated by a perforated plate or sieve tray. Water that is contaminated with volatile organic compounds is introduced into the top chamber, and flows across the top tray to a downcomer aperture, through which it descends to the next lower tray. The water height on each tray is controlled by the water flow rate and the height of a weir which surrounds the downcomer aperture. Water flows from the lowest tray into a sump chamber, which forms the base of the apparatus. Pumping or gravity discharge is used to maintain a constant level of treated water in the sumps.

Air is introduced into the sump chamber by means of a fan or blower, and flows upwardly through perforation holes in each of the trays. The air eventually exits through a vent stack in the top of the apparatus. Thus, the air generally flows in an opposite direction to the water. The water flowing over each sieve tray is therefore subjected to intense aeration by the air. The aeration causes a chaotic froth on each tray, and provides substantial air/water interface surface area for transfer (partitioning) of volatile organic chemicals from the aqueous phase to the air (gas phase). Thus, the air that exits from the top of the air stripper contains volatile organic constituents that were previously present in the aqueous phase.

For such a conventional arrangement, each sieve tray represents a stage of treatment, and in conventional practice each stage is built as a modular chamber to permit vertical assemblage. The top tray or chamber, which is the first stage in the treatment process, receives the water that requires treatment and allows discharge of the chemically laden stripping gas to the atmosphere. A given number of chambers, equivalent to the number of stages required for complete treatment, are stacked and clamped together to provide the completed assembly. Generally such conventional assemblies include a bottom chamber that acts as an air distribution plenum and also as a sump for the treated water.

In general, various trays or stages occasionally need service such as cleaning and/or replacement. One drawback to conventional configurations is the need to unclamp and dismantle the entire system in order to service any given tray. For example, cleaning of a tray may be needed in order to remove scaling due to water hardness or high levels of dissolved iron, which can plug the perforations. In typical, conventional systems, heavy equipment is generally needed in order to unstack the tray, since the trays and/or the stack of trays are generally heavier than can be easily handled manually.

Another problem with such conventional arrangements is generally that there has typically been no convenient way to visually judge the air distribution characteristics of each stage during operation. That is, real time interaction, while the assembly is operated, is generally limited to interpretation of instrument readings. One cannot, with conventional air strippers, observe the operation of any given stage or tray.

SUMMARY OF THE INVENTION

According to the present invention an air stripper assembly is provided. The air stripper assembly generally comprises a housing having at least one sieve tray operably positioned therein. The construction is such that the sieve tray can be selectively removed from within the housing. That is, the sieve tray is not a portion of the housing. If more than one sieve tray is positioned within the housing, the construction is such that each sieve tray can be selectively removed from the housing without the operator having to change the position or orientation of any other sieve tray located within the housing. That is, the sieve trays can each be independently removed, cleaned and replaced.

Preferably, each sieve tray has a perforated base plate with an outer periphery. A central baffle member is oriented on the base plate, to divide the base plate into first and second side sections. A downcomer aperture is positioned in one of the side sections. Preferably the tray includes a weir positioned around the downcomer aperture, to maintain selected and desirable water level and flow.

In most preferred embodiments, each tray is generally rectangular, having front and rear end edges and first and second side edges. The rear edge and the two side edges, in preferred embodiments, include walls to increase rigidity of the tray.

The sieve trays, in preferred constructions, are of a size, shape and weight that they can be readily handled by a single operator. Preferably the sieve trays are constructed of materials, such as stainless steel or plastic, so that they weigh no greater than about 40 to 50 lbs. Preferably each tray is sized so that an upper surface of the base plate has an area no greater than about 9 $ft^2$, and typically within the range of about 6.5 to 8.5 $ft^2$.

Preferred air stripper assemblies according to the present invention generally include at least one vertical stack of sieve trays therein. Each vertical stack of such a system preferably contains two to six trays. In certain embodiments, more than one vertical stack of trays can be positioned within a single housing.

Preferably air stripper assemblies according to the present invention include a removable front cover arrangement, through which each of the sieve trays is accessible, for maintenance. In preferred embodiments the cover is substantially transparent, so that operations within the housing can be viewed by the operator.

Preferably, each sieve tray rests upon a support framework, and is secured thereto by a securing mechanism. In preferred embodiments, the securing mechanism includes at least one spring loaded pin at or near the front edge of the trays, for easy access by the operator. Also, in preferred embodiments the securing mechanism includes a retaining bar positioned above an associated portion of the support framework on a back panel of the housing, to secure the tray against upward movement.

According to the present invention, preferred sieve trays for use in air stripper assemblies are provided. The sieve trays may be generally as described above. A preferred method of cleaning a selected sieve tray in an air stripper assembly is also provided, by the apparatus.

BRIEF DESCRIPTION OF THE DRAWINGS

FIG. 2 is a side elevational schematic view of a portion of the arrangement shown in FIG. 1, generally from the perspective of line 2—2 therein; in FIG. 2 an outer side wall is shown broken away to provide visual inspection of inner components; a top one of the inner trays is shown being removed; and, certain lower trays have been removed.

DETAILED DESCRIPTION OF THE INVENTION

Figure 1:
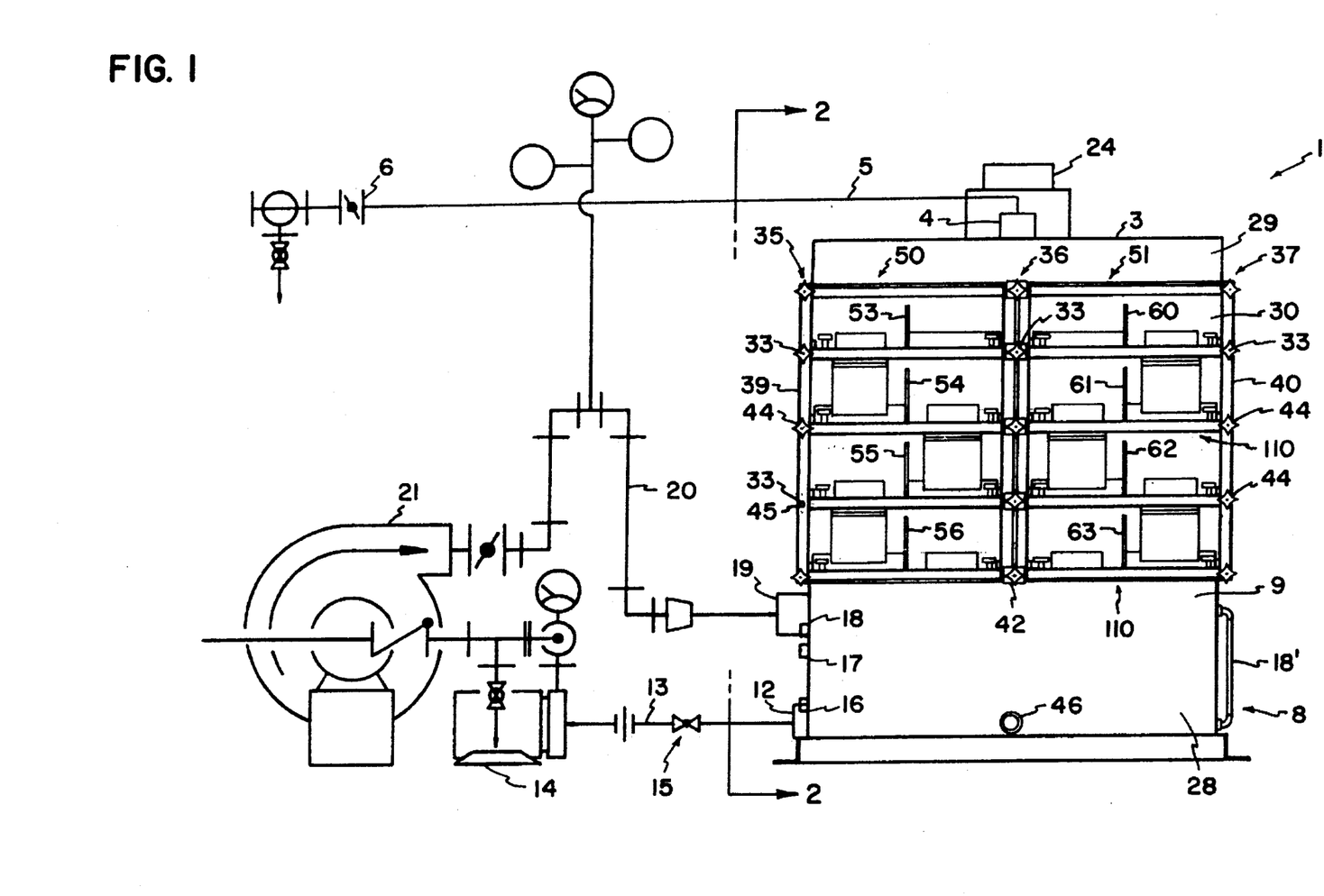
FIG. 1 is a front view of an air stripper arrangement according to the present invention, with equipment and equipment lines for operation depicted schematically.

The reference numeral 1, FIG. 1, generally depicts an air stripper assembly 1 according to the present invention. Air stripper assembly 1 generally comprises a housing 3 having, contained therein, various equipment as described in more detail below. A water inlet to housing 3 is generally indicated at 4, with water being fed in via line 5. Water flow in line 5 is shown controlled by valve 6.

In operation, a bottom portion 8 of housing 3 comprises a sump 9, into which water flows after the assembly 1 has been operated to strip volatiles therefrom. A water outlet from sump 9 is indicated generally at 12, with water flow through outlet line 13 being controlled by pump assembly 14. Various control apparatus to regulate water height in sump 9, and to start and stop the water flow rate entering inlet 4, can be used. The apparatus is indicated generally at 15. In preferred embodiments a float valve or similar device can be used to turn on and off a drain pump, as desired, and/or to turn off water flow into the apparatus, as desired. Referring to FIG. 1, at 16 a "low water level" detector is shown, to detect when water is at a lowest desirable level in the sump 9, and to then turn off the pump 14. At 17 a "high water level" detector is shown, to detect a highest desired level of water in sump 9, and to turn on pump 14. At 18, an emergency water level detector is positioned. It can be used to turn off water flow into the arrangement 1, if the sump pump 14 is inadequate to control flow. A sight glass is depicted at 18', for viewing a level of water in sump 9.

An air inlet 19 is positioned in sump 9, above a level at which water is generally allowed during operation. Air flow into inlet 19 is indicated through line 20, and is controlled by blower 21. In operation, the air moves from inlet 19 upwardly through housing 3, until it escapes through air outlet 24, in an upper portion of the assembly 1. Within assembly 1, during operation, the air bubbles through the downwardly moving water, stripping volatile organics therefrom. The volatile organics, then, escape through air outlet 24 along with the air. Air from outlet 24 may be directed to the environment, or various arrangements for removal of (or control of) the stripped, volatile, organics therein.

In general, housing 3 comprises a container 28 having a front wall 29. For the preferred embodiment shown, a portion of front wall 29 comprises a removable front cover 30. Preferably, the removable front cover 30 comprises one or more sheets of transparent, or substantially transparent, material such as glass or plastic to provide viewing of operations conducted within container 28.

For the arrangement shown, front cover 30 is mounted on container 28 by support upon a plurality (fifteen in the embodiment shown) of threaded posts 33, each of which projects through the cover 30. In the arrangement shown in FIG. 1, the posts 33 are oriented in three vertical columns 35, 36 and 37, respectively. Columns 35 and 37 comprise posts mounted on outer ledges or flanges 39 and 40, respectively. Column 36 comprises posts mounted on a central portion 42 of front wall 29. For the arrangement shown in FIG. 1, front cover 30 is secured upon posts 33 by threaded knobs 44. That is, if the fifteen knobs 44 are threadably loosened and removed, front cover 30 can be easily slid from mounting posts 33, allowing access to an interior of container 28. It is noted that in FIG. 1, the arrangement 1 is depicted with a knob removed from post 45, for clarity.

In typical, preferred, systems a seal arrangement will be provided between cover 30 and a remainder of housing 3, to provide a water tight seal thereat. Typically, a gasket, such as a neoprene gasket, provided along portions of the housing 3, against which cover 30 is pressed when mounted, will be sufficient. A continuous bead appropriately positioned on an interior surface of the cover 30 may be utilized to facilitate the seal. In such a manner, an effective water tight seal can be provided with a system wherein the knobs 44 are only hand tightened to retain the cover 30 in position.

The housing 3 includes a bottom drain 46, for convenient emptying, for example in cleaning. In general, air stripper assemblies according to the present invention include, within the housing, at least one sieve tray. Typically, the arrangement will include at least one vertical stack having more than one sieve tray. The particular assembly 1 shown in FIGS. 1 and 2 includes two adjacent vertical stacks 50 and 51 oriented laterally adjacent to one another (And systems according to the present invention may include any number of vertical stacks of trays.). The operation of each of stacks 50 and 51 is basically the same as the other. However, as can be seen from a review of FIG. 1, stack 51 is generally a mirror image of stack 50, if the mirror image plane is drawn perpendicular to the viewer and down the center of housing 3. Operation of the stacks (50, 51) of trays will be better understood by reference to FIGS. 3 and 4. In FIG. 1 stack 50 comprises trays 53, 54, 55 and 56; and stack 51 comprises trays 60, 61, 62 and 63.

Figure 3:
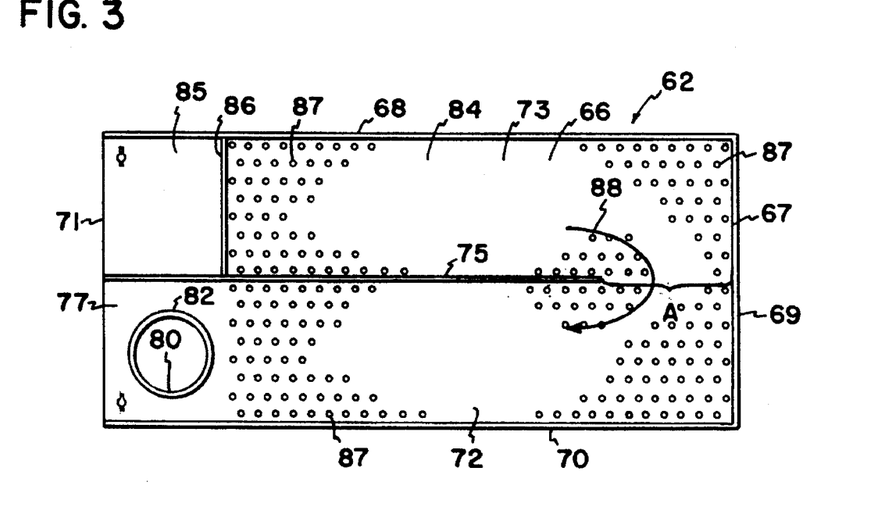
FIG. 3 is top plan view of a tray usable in the arrangements shown in FIGS. 1 and 2.
Figure 4:
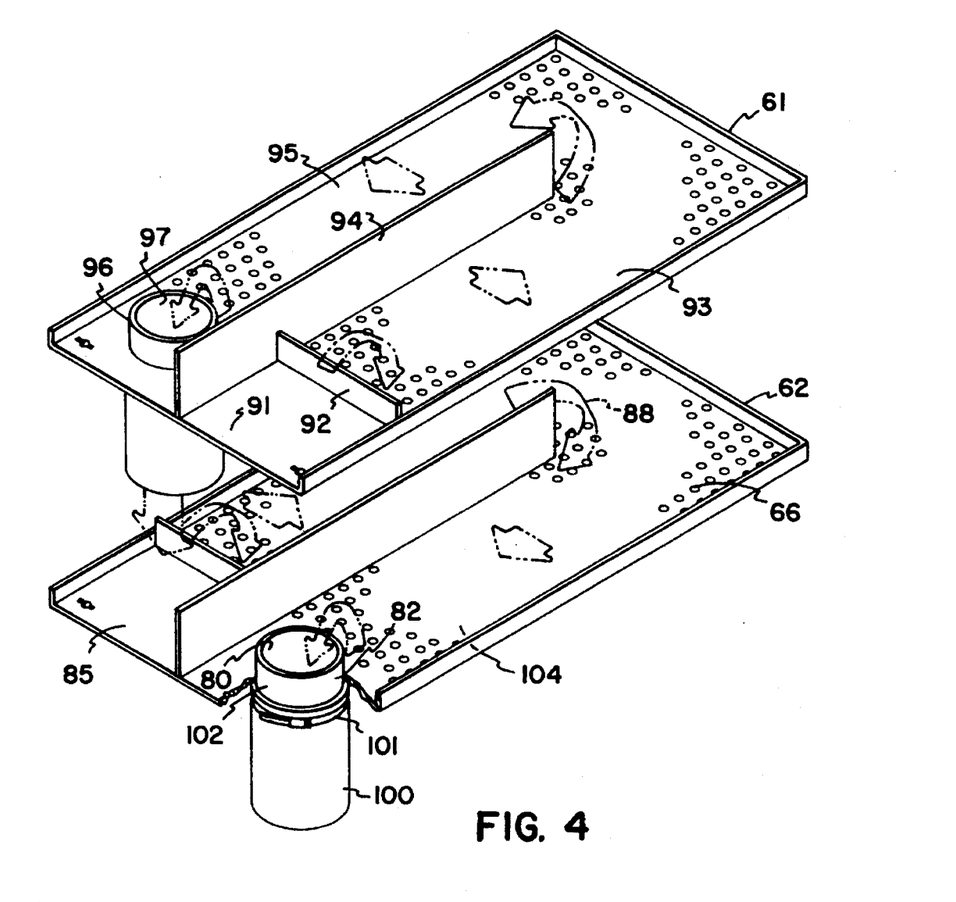
FIG. 4 is an exploded schematic view of two trays, generally analogous to trays shown in FIGS. 1–3, depicted oriented vertically with respect to one another, to illustrate operation of arrangements according to the present invention; one of the trays being shown with a portion broken away therefrom, to facilitate understanding.

Referring to FIG. 3, a top plan view of tray 62 is shown. Referring to FIG. 1, tray 62 is generally analogous to trays 54, 60 and 56; and is a mirror image of trays 53, 61, 55 and 63. Thus, the basic features of all of the trays in the preferred arrangement of FIG. 1 can be generally understood by reference to FIGS. 3 and 4. In FIG. 4 tray 62 is shown in operative (exploded) association with tray 61. By "exploded" it is meant that in FIG. 4, trays 61 and 62 are depicted spaced apart a greater extent than they would typically be in operation.

Referring to FIG. 3, tray 62 comprises a perforated base sheet 66 having, along a portion of an outer periphery thereof, upwardly projecting wall or rim 67. For the particular embodiment shown, perforated base sheet 66 is generally rectangular and rim 67 extends along three edges 68, 69 and 70, respectively. Edge 71, which is directed toward front wall 29 of the housing 3, FIG. 1, i.e., toward front cover 30, does not include a rim thereon. However, when the tray 62 is positioned within the housing 3 and cover 30 is positioned thereon, the cover 30 will operate to close edge 71.

In general, an upper surface of tray 62 is divided into sides 72 and 73 by central divider 75, which extends in a direction generally parallel to edges 68 and 70. Divider 75 does not extend a complete longitudinal length of tray 66. Rather, it preferably extends from edge 71 a distance equal to the length of tray 66 minus one-half of its width. In general, if the divider 75 extends further, gap A will tend to operate as a restriction to water flow. If the divider 75 extends a shorter distance, less effective aeration may result.

Side 72 includes, in a front portion 77 thereof, a downcomer aperture 80 therein. In use, water flows downwardly through downcomer aperture 80, after it has been aerated on sheet 66. Downcomer aperture 80 is surrounded by, and is in part defined by, weir 82. Thus, in use the water depth on side 72 must exceed the height of weir 82, before the water pours downwardly through aperture 80.

Operation of tray 62, FIG. 3, is generally as follows. Water is directed onto a top surface 84 of the tray 62 at front portion 85 of side 73. When the water depth is great enough, the water will flow over wall 86 onto a portion of side 73 having aeration apertures 87 therein. The water will generally flow around divider 75 in the direction indicated by arrow 88. As the water passes over perforations 87, air, bubbling upwardly therethrough, will strip volatile organics from the water. When the water depth is higher than weir 82, the water will pour downwardly through downcomer aperture 80. It will be understood that in some systems, an air stripping operation can be conducted with the use of a single tray, such as tray 62. However, in many systems more than one vertically oriented tray will be preferred.

Referring to FIG. 4, tray 62 is shown oriented with a mirror image tray 61, positioned vertically thereover in a manner analogous to the way the trays are vertically oriented in assembly 1, FIG. 1. Thus, tray 61 includes a front portion 91 to which water is initially directed. When the water depth exceeds wall 92, the water is directed to perforated side 93. The water travels around central divider 94, across the perforated half 95, over weir 96 and through downcomer aperture 97, onto front section 85 of tray 62. The water then flows as indicated in FIG. 3, through downcomer aperture 80, to tray 63 (depicted in FIG. 1).

As shown in FIG. 4, to facilitate direction of water, a flexible downcomer tube 100 is clamped as indicated by hose clamp 101, to a rim 102 positioned around aperture 80 on a portion thereof projecting outwardly from a bottom side 104 of perforated base sheet 66. Preferably the downcomer tube 100 on each tray is sufficiently long to extend below the height of the downcomer weir (analogous to weir 82) of the next lower tray, so that when water flows through the system, the bottom end of each downcomer tube is submerged, forming an air seal inhibiting air flow upwardly through the downcomer apertures 80 rather than the perforations on the tray. The downcomer tube(s) on the lowermost tray(s) should be long enough to be submerged in the sump 9.

Figure 5:
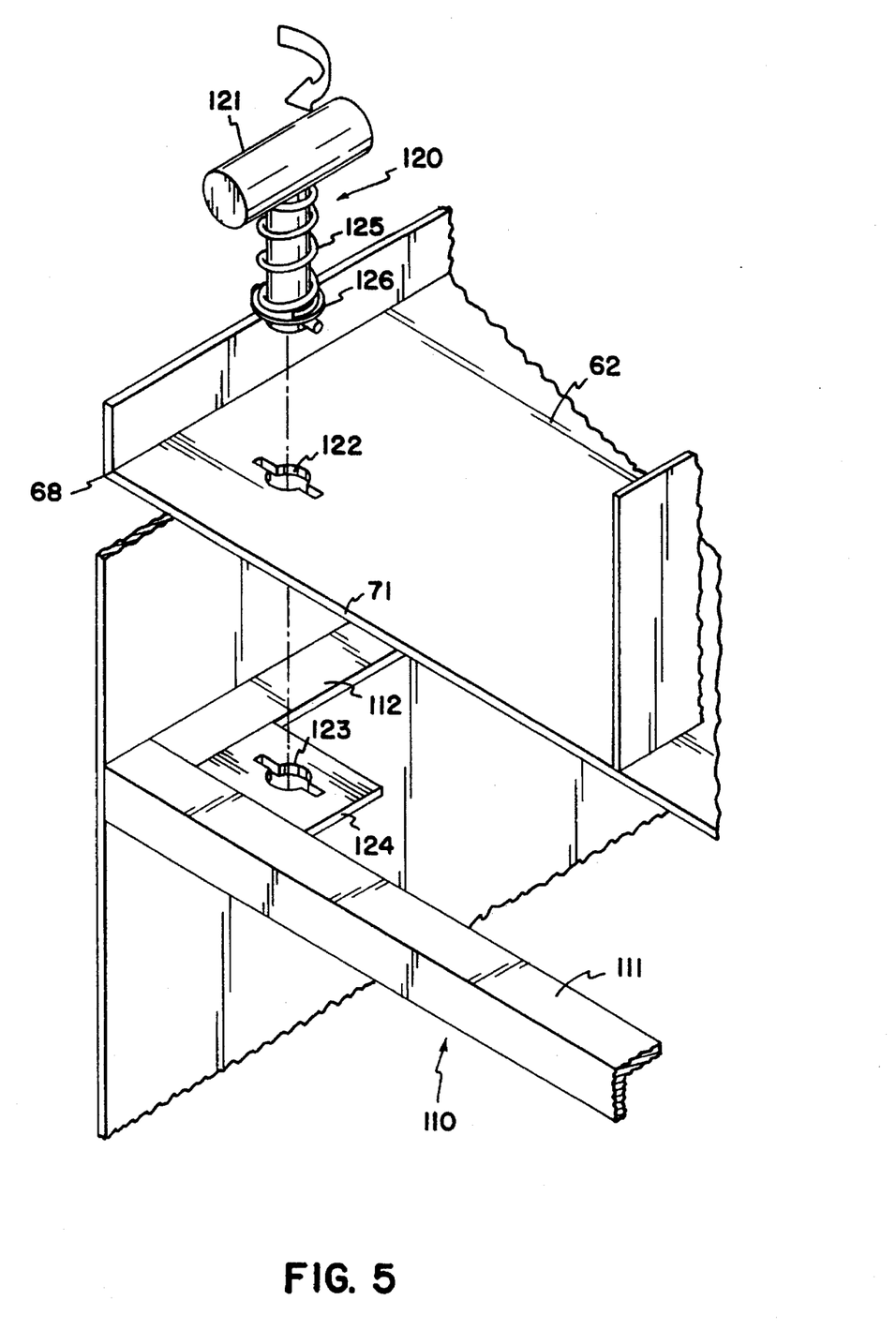
FIG. 5 is an enlarged fragmentary exploded perspective view of a portion of the arrangement shown in FIGS. 1 and 2.

Referring to FIGS. 1 and 5, preferably each tray (53, 54, 55, 56, 60, 61, 62, 63) is supported along edge portions thereof by a support framework (110) appropriately positioned within housing 3. In general, angled rods positioned within housing 3, appropriately for each tray, can be used. Referring to FIG. 5, for example, tray 62 is shown oriented in association with front angle 111 and one side angle 112. In general, front angle 111 is oriented to extend along or near front edge 71; and, angle 112 is shown oriented to extend along, and support, side edge 68. It will be understood that an analogous angle to angle 112 can be positioned along edge 70, and a similar support to angle 111 can be positioned to extend along rear end 69.

In preferred arrangements according to the present invention, a securing arrangement is used to ensure that tray 62 remains securely held downwardly upon the support framework 110. In FIG. 5, an arrangement for securing front edge 71 to angle 111 is shown. In FIG. 5, the securing arrangement is indicated generally at reference numeral 120 and comprises manually operated pin 121. Pin 121 is spring loaded and is not merely circular. Thus, once it is depressed to project through key aperture 122 on front edge 71, and a corresponding key aperture 123 on a plate 124 attached to angle 111, the pin can be rotated 90°, relative to its orientation shown in FIG. 5, and biasing pressure from spring 125 (and washer 126) will retain the tray 62 secured against angle 111. Referring to FIG. 1, preferably each tray has two pins oriented along a front edge thereof, for securing with front angles as shown in FIG. 5. The pins are preferably oriented along front edges of each tray so they can be readily accessed by an operator.

Figure 2:
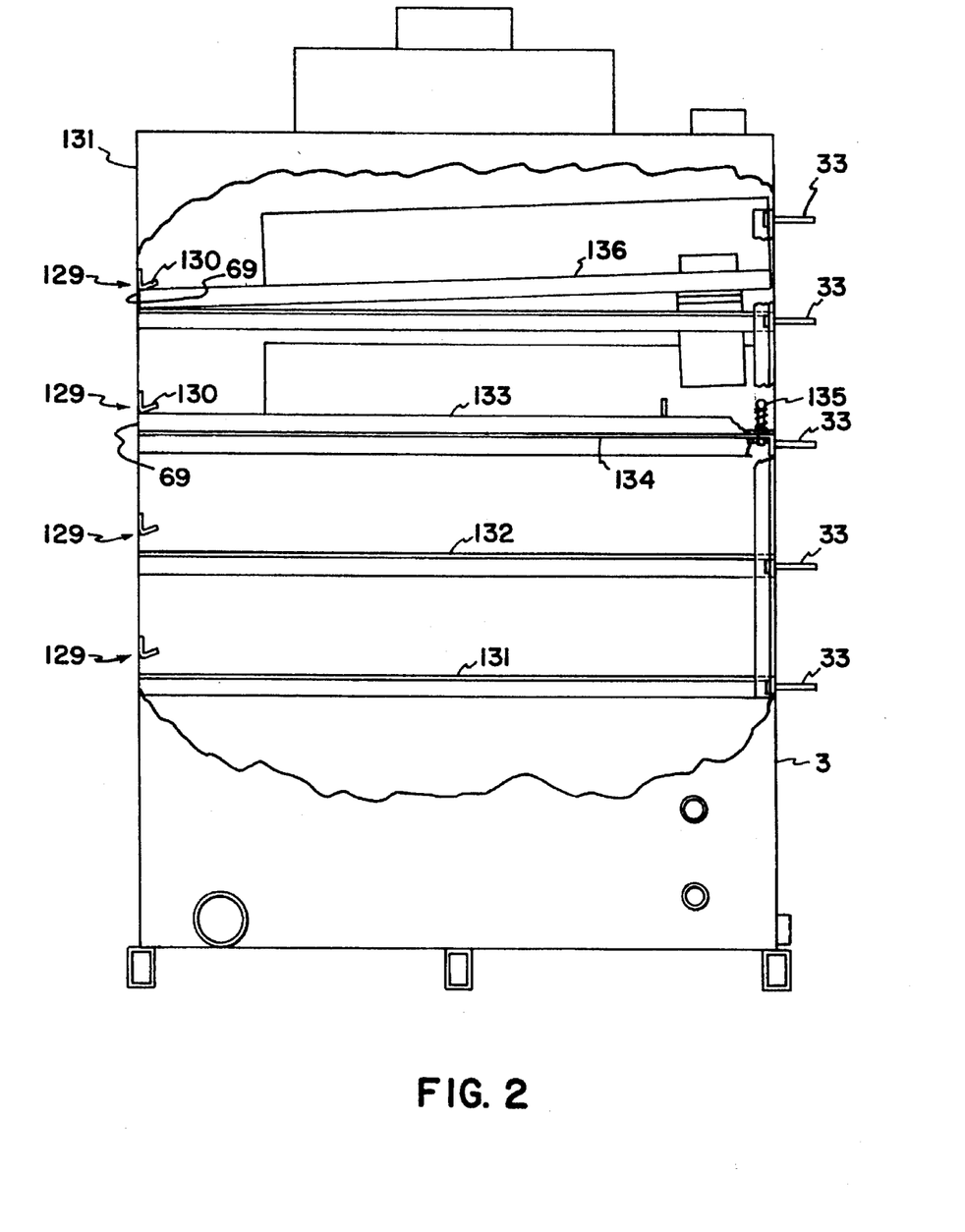

Referring to FIG. 2, a securing mechanism 129 is shown oriented to secure a rear edge of each tray. Securing arrangement 129 generally comprises an angled bar or stop 130 positioned along back wall 131 of housing 3. Angle 130 is positioned such that the rear wall/edge along rear edge 69 of each tray will be secured thereunder, when the tray is positioned in housing 3. That is, angle 130 prevents the rear edge 69 of each tray from lifting and the front pins prevents the front edge of each tray from lifting. Thus, each tray is anchored against vertical bouncing in housing 3. It is noted that in FIG. 2, the assembly 1 is shown with trays removed from levels 131 and 132. The tray 133 on level 134 is shown broken away so that pin 135 is viewable. Tray 136 is depicted being removed.

Referring to FIGS. 1, 2 and 5, the convenience of systems according to the present invention will generally be understood. Referring to FIG. 1, access to the trays is generally accomplished by removing knobs 44 and removing cover 30. Any selected tray can be released for servicing by removing the front pins thereof and sliding the selected tray forwardly along the supporting side rails, angles or framework. A tray can be cleaned without completely removing it from the assembly 1. However, if desired, the tray can be completely removed from assembly 1 and be replaced with a second tray. The trays can be constructed of material such that they can be easily handled by a single operator, without the need for special handling equipment. If necessary, to accommodate a large water flow, the trays can be oriented in a plurality of vertically aligned stacks, as indicated in FIG. 1. Thus, the size of the trays can be held to an easily manageable maximum, while at the same time allowing for a large flow of water through the assembly 1.

Referring to FIG. 1, it is not necessary that a central divider be placed between the vertical stacks of trays. That is, the water can be allowed to flow across trays on any given level.

It will be understood that, in general, to facilitate disassembly, before any selected tray would be slid forwardly out of housing 3, the flexible downcomer tube, for example tube 100 FIG. 4, should be removed from that tray by loosening the associated clamp (101). Since the downcomer tube 100 is positioned near the front edge 71 of the tray, such an operation is straight forward.

In general, the trays and housing should be sized and configured so that there is relatively little leakage of water therebetween. That is, preferably the arrangement is constructed so that the vast majority of water passing therethrough must flow over the perforated trays and through the downcomers as described. In general, this can be accomplished by appropriately sizing components. However, gaskets or similar seals may be used to facilitate this if desired.

Referring to FIG. 1, it will be understood that water flow within the assembly can be readily observed through transparent cover 30. This allows visual inspection to assist in viewing whether any given tray is becoming sufficiently plugged for ineffective operation.

Advantages to the present invention will be apparent, from a review of the figures in association with the above description. Any selected tray can be partially removed or completely removed from the housing for service. Servicing can be conducted without the need to effect changes in the position or operation of any other tray. Special handling equipment is not needed since the majority of the trays can remain fixed or secured in place, while any given tray is serviced. The equipment is located where it can be easily accessed by workers and it is sized such that it can be handled by a single individual, if desired, without assistance.

In the following section, preferred construction and engineering details for operation of a typical, preferred, assembly according to the present invention are provided. From these details a general understanding of the invention, which may be applied in a variety of alternate specific systems, will be further derived.

A CASE STUDY

PROBLEM: Underground water in a service station site is contaminated as indicated in the "Inlet" column of the following table.

| Contaminant | Inlet to Stripper (ppm) | Outlet from Stripper (ppm) |
| --- | --- | --- |
| Benzene | 133 | ND* |
| Toluene | 135 | ND |
| Ethyl Benzene | 28 | ND |
| M & P Xylene | 1,191 | ND |
| O Xylene | 625 | ND |

*ND = not detectible at 5 ppm detection limit.

SOLUTION: An air stripper according to the present invention was installed and operated at 60 gpm (gallons per minute), with the results shown above under the Outlet column as ND.

The design characteristics of the air stripper were as follows:

Housing:

Made out of carbon steel, it measures 48" wide× 47¾" long×60" high and having framework appropriate to hold two laterally spaced, four-tray sets with 9" vertical spacing between trays.

The water inlet is a 6" opening located at the top, toward the front center line of the housing.

The air inlet is a 4" coupling located in the center line of the left side of the sump chamber, 15" from the bottom.

The water outlet is a 3" coupling located on the same side as the air inlet, 6" from the back and 2" from the bottom.

The housing has two hatches on the front, situated 18¾" from the bottom. These hatches allow the trays to be removed for periodic cleaning of iron precipitate and hardness deposits which impair the removal efficiency of contaminants.

Hatch Doors:

The door assembly is a rectangular aluminum frame made out of 1⅛" aluminum channel or square aluminum tubing. This frame is 35½" high×25⅓" wide with horizontal beams of the same frame material, which coincide with the locations of the trays for easy observation of aeration pattern and scheduling of maintenance cleanup.

The aluminum frame holds a transparent polycarbonate sheet 25⅜" wide×36" high ½" thick by means of selftapping screws. The polycarbonate-aluminum frame assembly has holes that match the bolts on the periphery of the hatch, thus allowing to seal the housing by hand-tightening the knobs over the frame.

Trays:

The trays are made of 304 stainless steel (aluminum can also be used) plate ⅛" thick perforated with holes 3/16" in diameter located in the corners of equilateral triangles having 1½" pitch (distance between adjacent corner holes). Of the entire tray area, 15 to 20% is not perforated and is reserved for the tray inlet area of the downcomer and the tray outlet area of the weir.

The downcomer weir is a 6" O.D. stainless steel tubing two inches high above the tray and protruding one inch below the tray. The downcomer tube, which is 7½" long, is made of collapsible PVC hose and attaches to the bottom of the weir by means of a hose clamp. The perpendicular baffle which divides the tray into a left and a right side area is 5" high and is also made out of stainless steel. Downcomers can also be made out of schedule 20 PVC pipe, steel-reinforced neoprene ducting, or rubber hose in some instances.

Aeration:

An air flow rate of 600 CFM at standard conditions was provided by a 7.5 HP motor to accomplish the removal of volatile contaminants while moving counter-currently to the downward flow of water. The contaminant laden air phase on the top tray discharged to the atmosphere through a demister- 8" O.D. exhaust pipe.

Water Discharge:

The treated water which accumulated in the sump chamber of the housing was discharged by gravity through a 3" diameter pipe connected to a 23" height, 6" diameter inverted U with top vent pipe.

The dimensions given in this case study were selected for the particular application to provide both efficient hydraulic performance and contaminant removal.

In general, the size of the trays is calculated to provide a hydraulic loading no greater than 6.25 gallons per minute per square foot. If the contaminants removal efficiencies are not met, the hydraulic loading is reduced by selecting a larger tray until satisfactory removal efficiencies are achieved with no more than 6 trays, but preferably with 4 trays.

The removal efficiencies are described by the Kremser equations for counter-current multistage operations, as found in Mass Transfer Operations, R. E. Treybal, McGraw-Hill Book Company, p. 128, 1980. By reducing the hydraulic loading, the volumetric air-to-water ratio is increased to improve contaminant removal and reduce the number of stages. BioTrol uses a fixed air space velocity of 45 feet per minute in all air stripper designs in order not to carry over water particles coarser than mist, that is, 0.2 millimeters. (BioTrol, Inc. of Eden Prairie, Minn. 55344, is the assignee of the present invention.)

What is claimed is:

1. An air stripper assembly comprising:
   (a) a housing including a selectively removable front cover;
   (b) at least two sieve trays oriented in a first vertical stack;
      (i) each of said at least two sieve trays in said first vertical stack being selectively removable from within said housing when said front cover is removed;
      (ii) each one of said at least two sieve trays in said first vertical stack being selectively removable from within said housing without a need to change an orientation of the other one of said at least two sieve trays positioned within said first vertical stack in said housing;
      (iii) each one of said at least two sieve trays in said first vertical stack comprising:
         (A) a single-piece rectangular base plate having air flow perforations therein and having an outer periphery comprising front and rear end edges, and first and second side edges;
         (B) upwardly projecting edge walls positioned along said rear end edge and said side edges; said front edge being characterized by an absence of an upwardly projecting edge wall extending thereal- ong;
         (C) an upwardly projecting central divider extending along a central position of said base plate in a direction generally parallel to said side edges; said central divider beginning at said front end edge and terminating short of said rear end edge; said central divider dividing an upper surface of said single-piece base plate into first and second sides;
         (D) a downcomer aperture positioned in one of said first and second sides of said base plate; said downcomer aperture being of greater size than any one air flow perforation in said base plate; and
         (E) a downcomer weir positioned on said base plate upper surface and surrounding said downcomer aperture; said downcomer weir being oriented so that the only aperture in said base plate which it surrounds is said downcomer aperture;
   (c) a supporting framework within said housing for each of said at least two sieve trays; said supporting framework being oriented such that each of said at least two sieve trays can be independently slid into and out of said housing, by sliding movement on said supporting framework, when said removable front cover is removed from said housing;
   (d) means for directing water flow downwardly through said first vertical stack during use; and,
   (e) means for directing air flow upwardly through said air flow perforations in said sieve trays of said first vertical stack, in use, whereby the air flow can strip volatiles from the water flow.

2. An air stripper assembly according to claim 1, wherein:
   (a) each one of said at least two sieve trays in said first vertical stack has a base plate with an upper surface area of at least 6.5 ft$^2$.

3. An air stripper assembly according to claim 2, wherein:
   (a) each one of said at least two sieve trays in said first vertical stack is constructed so as to weigh no more than 50 lbs.

4. An air stripper assembly according to claim 1, including:
   (a) at least two sieve trays oriented in a second vertical stack;
      (i) each of said sieve trays in said second vertical stack being selectively removable from within said housing when said front cover is removed;
      (ii) each one of said sieve trays in said second vertical stack being selectively removable from within said housing without a need to change an orientation of the other sieve tray positioned within said second vertical stack and within said housing;
      (iii) each one of said at least two sieve trays in said second vertical stack comprising:
         (A) a single-piece rectangular base plate having air flow perforations therein and having an outer periphery comprising front and rear end edges, and first and second side edges;
         (B) upwardly projecting edge walls positioned along said rear end edge and said side edges; said front edge being characterized by an absence of an upwardly projecting edge wall extending thereal- ong;
         (C) an upwardly projecting central divider extending along a central position of said base plate in a direction generally parallel to said side edges; said central divider beginning at said front end edge and terminating short of said rear end edge; said central divider dividing an upper surface of said single-piece base plate into first and second sides;
         (D) a downcomer aperture positioned in one of said first and second sides of said base plate; said downcomer aperture being of greater size than any one air flow perforation in said base plate; and
         (E) a downcomer weir positioned on said base plate upper surface and surrounding said downcomer aperture; said downcomer weir being oriented so that the only aperture in said base plate it surrounds, is said downcomer aperture;
   (b) means for directing water flow downwardly through said second vertical stack, during use; and
   (c) means for directing air flow upwardly through said air flow perforations in said sieve trays of second vertical stack, in use, whereby the air flow can strip volatiles from the water flow.

5. An air stripper assembly according to claim 1, wherein:
   (a) said housing includes a securing bar operably positioned to prevent a rear end edge of an associated sieve tray from lifting, when the sieve tray is operably positioned within the housing.

* * * * *

UNITED STATES PATENT AND TRADEMARK OFFICE
CERTIFICATE OF CORRECTION

PATENT NO. : 5,518,668

DATED : May 21, 1996

INVENTOR(S) : Chresand et al.

It is certified that error appears in the above-identified patent and that said Letters Patent is hereby corrected as shown below:

In column 8, line 8, "25 1/3" should read --25 1/4--.

Signed and Sealed this

Twenty-fourth Day of September, 1996

*Attest:*

BRUCE LEHMAN

*Attesting Officer*　　*Commissioner of Patents and Trademarks*